July 12, 1960 A. S. KRIVULKA 2,944,864

CHASSIS AND RACK APPARATUS

Filed Aug. 14, 1957 2 Sheets-Sheet 1

INVENTOR.
Albert S. Krivulka,
BY
Paul & Paul
ATTORNEYS.

July 12, 1960 A. S. KRIVULKA 2,944,864

CHASSIS AND RACK APPARATUS

Filed Aug. 14, 1957

2 Sheets-Sheet 2

INVENTOR.
Albert S. Krivulka,

BY Paul & Paul
ATTORNEYS.

United States Patent Office 2,944,864

Patented July 12, 1960

2,944,864

CHASSIS AND RACK APPARATUS

Albert S. Krivulka, Collingdale, Pa., assignor to South Chester Corporation, Chester, Pa., a corporation of Delaware Filed Aug. 14, 1957, Ser. No. 678,214

4 Claims. (Cl. 312—320)

This invention relates to improvements in chassis and rack apparatus for use with electronic equipment, and more particularly concerns chassis and rack apparatus wherein the chassis is quickly inserted into the rack, securely held, and quickly removed from the rack. This invention also relates to the latching mechanism for such chassis and rack apparatus.

It has long been desired to supply chassis and rack apparatus of simplified design, requiring a minimum of space for installation, providing for flush mounting of the cover panel, in which the chassis is quickly inserted, in which the latching mechanism is provided with a positive self-locking action, which moves the chassis into locked position in a positive manner and which moves the chassis from the locked to the unlocked position in a positive manner, which insures the engaging or disengaging of electronic connector pins between the chassis and the rack, which resists pull-out forces up to ten times the weight of the chassis, which provides a chassis that is easily carried, and in which the chassis when locked into position in the rack is firmly locked aganst movement in all three planes of motion.

It is accordingly an object of this invention to provide such chassis and rack apparatus. Other objects are to provide such apparatus which is flush mounted, which resists pull-out pressure of more than 1000 pounds, which is provided with means for easily carrying a chassis weighing more than 100 pounds, which exerts a minimum pressure of 20 pounds between the chassis and rack on opening and closing, which has a positive opening and closing action between the chassis and the rack, and which resists motion in three directions of the chassis relative to the rack.

It is another object of the invention to positively force the chassis into its rack position and to finish the insertion of the chassis electronic connector pins with the rack electronic connectors.

Other objects and advantages of this invention will further become apparent hereinafter and in the drawings which:

Figure 1:
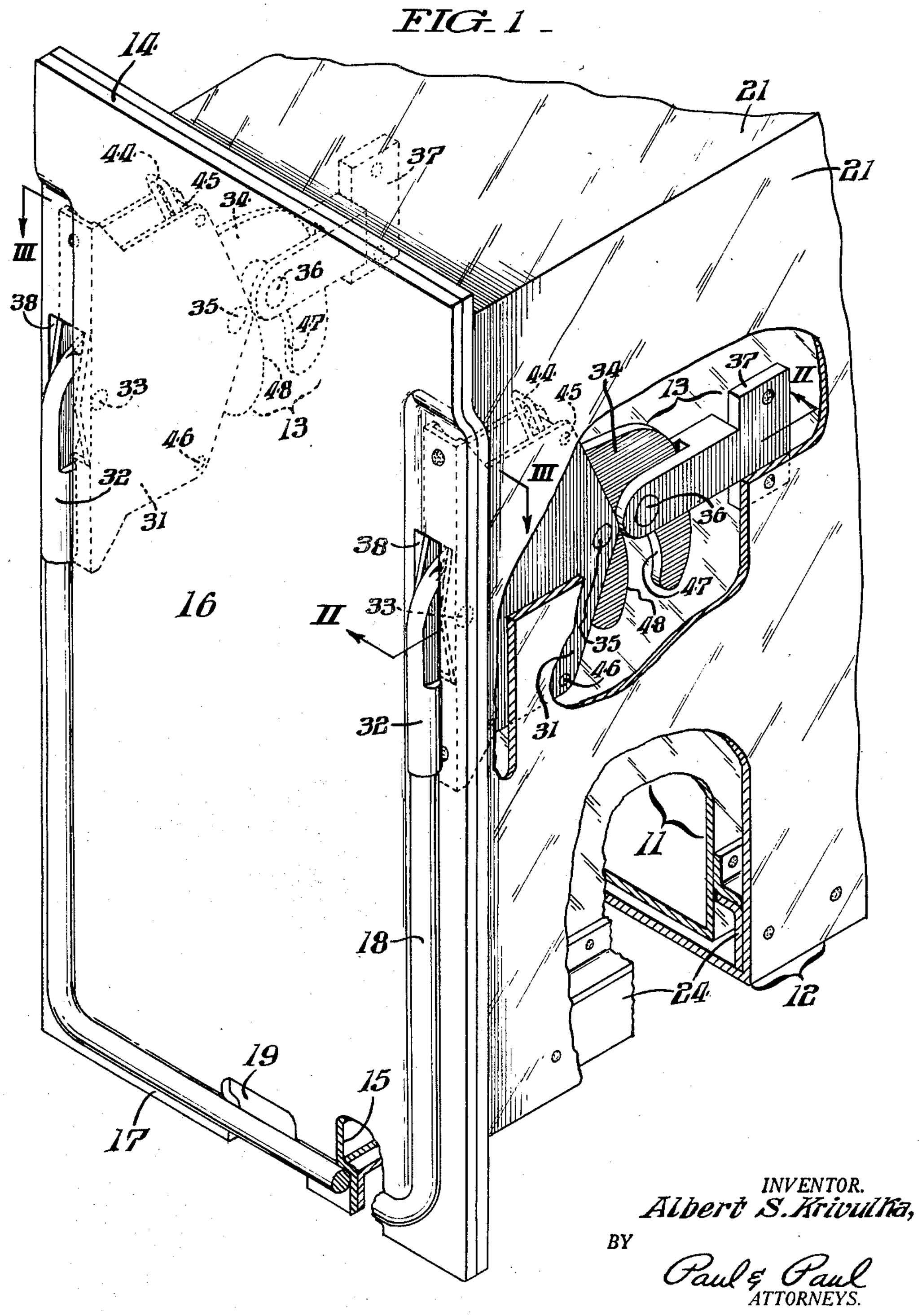
Fig. 1 represents a view in perspective and partly broken away of apparatus constructed in accordance with this invention.

Although specific terms are used in the following description for clarity, these terms are intended to refer only to the structure shown in the drawings and are not intended to define or limit the scope of the invention.

Turning now to the specific embodiment of the invention selected for illustration in the drawings, the number 11 designates generally a chassis which is constructed and arranged to slide and fit within a rack 12 and to be locked in place by latching mechanism 13.

The chassis 11 is mounted on the inner side 15 of cover panel 14. The outer side 16 of cover panel 14 is provided with a recess 17 and with a handle 18 which fits within the recess. A handle cut out 19 formed in cover panel 14 provides for easily grasping of the handle 18 when it is in flush position.

Rack 12 is provided with side walls 21, a closed end wall 22 and an opening 23 formed by side walls 21. Within rack 12 and mounted on the side walls are slide angles 24 on which chassis 11 slides into and out of the rack.

Figures 2, 3, 4, 5, 6, 7:
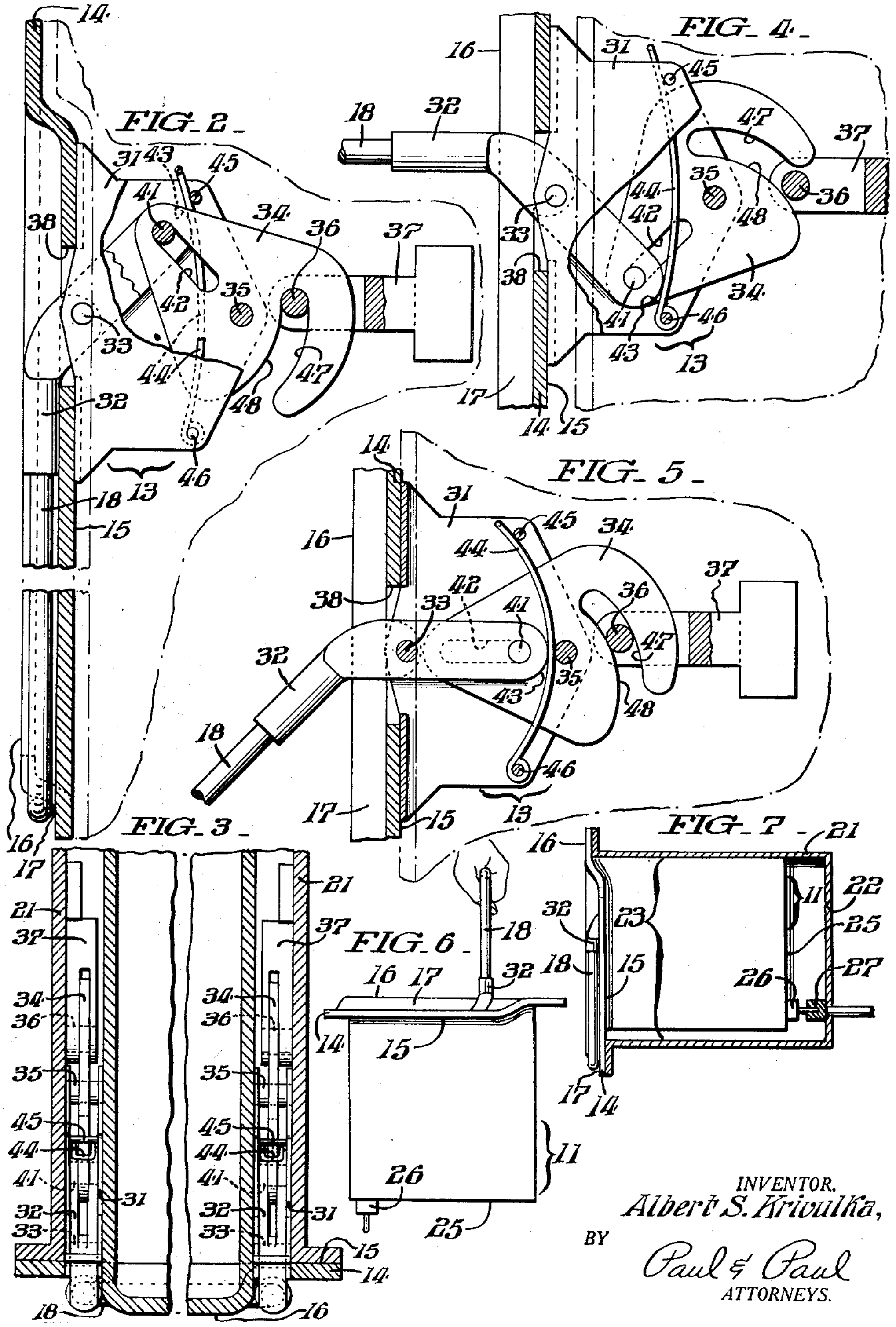
Fig. 2 represents a view in section taken as indicated by the lines and arrows II—II which appear in Fig. 1.
Fig. 3 represents a view in section taken as indicated by the lines and arrows III—III which appear in Fig. 1.
Figs. 4 and 5 represent views similar to Fig. 2 and show different phases of the operation of the apparatus.
Fig. 6 shows a view in side elevation of the chassis element of the invention after it has been withdrawn from the rack.
Fig. 7 shows a view in side elevation illustrating the electrical connections.

As is shown in Fig. 7, end wall 25 of chassis 11 has mounted thereon electrical pin connectors 26 which are located so that they make connection with electrical connectors 27 mounted in end wall 22 of rack 12. To insert connectors 26 into connectors 27, a pressure of at least five pounds must be exerted between the two sets of connectors.

Latching mechanism 13 includes a housing 31 which is mounted on inner side 15 of cover panel 14, a lever 32 which is pivoted to housing 31 by pin 33, a cam 34 which is pivoted to housing 31 by pin 35, and a keeper pin 36 which is fixedly mounted to side walls 21 by bracket 37.

Lever 32 is positioned within an opening 38 in cover panel 14 and is connected at one end to handle 18. The other end of lever 32 is provided with slide pin 41 which slides within a slot 42 formed in cam 34. The nose 43 of lever 32 is in contact with a wire spring 44 that is mounted on housing 31. Spring 44 serves to keep the lever 32 and handle 18 steady in the closed position shown in Fig. 2 or in the open position shown in Fig. 4. Spring 44 is provided with pins 45 and 46 mounted in housing 31.

Cam 34 is provided with two cam surfaces. Cam surface 47 is used in inserting chassis 11 into rack 12 and cam surface 48 is used in removing chassis 11 from rack 12.

In assembly, lever 32 is inserted through opening 38 of cover panel 14 and handle 18 is inserted into a receiving aperture in lever 32. Then handle 18 is pinned, soldered or otherwise joined to lever 32.

In operation, at its place of storage chassis 11 is picked up by handle 18 as shown in Fig. 6. Then chassis 11 is inserted into rack 12 until the apparatus assumes the position shown in Fig. 4. Next handle 18 is rotated successively to the positions as shown in Figs. 5 and 2. Cam surface 47 bears against keeper pin 36 to pull up cover panel 14 into flush position with rack 12 and to complete the insertion of electrical pin connectors 26 into electrical connectors 27. Spring 44 acts on nose 43 of lever 32 to hold lever 32 and handle 18 in a steady position when the apparatus is in open position as shown in Fig. 4. Similarly, when the apparatus is in closed position as shown in Fig. 2, spring 44 acts on nose 43 of lever 32 to hold lever 32 and handle 18 in a steady closed position.

In removing chassis 11 from rack 12 the above mentioned procedure is reversed and the apparatus passes from the position of Fig. 2, through the position of Fig. 5, to the position of Fig. 4, whereupon chassis 11 is lifted from rack 12 and carried away by handle 18 as is illustrated in Fig. 6.

The apparatus provides the outer side 16 of cover panel 14 with a flush face since handle 18 is recessed. Chassis 11 resists a force tending to pull it out of rack 12 in excess of 1200 pounds. It is important to note that when the handle 18 is in its locked position, any force tending to slide the chassis 11 out of rack 12 just causes cam 34 to lock tighter. Latching mechanism 13 cannot accidently jar loose, vibrate loose, or be knocked open, even if the handle 18 is not pushed exactly flush against recess 17. Latching mechanism 13 can be unlocked only by raising handle 18 through an angle of 90°.

Latching mechanism 13 exerts a minimum pressure of 20 pounds between chassis 11 and rack 12 for camming chassis 11 into position. To do this, only a two pound push is needed on handle 18. If the handle is pushed with more force, the pressure exerted between chassis 11 and 12 to push them into lock position is even greater. This apparatus resists relative motion between chassis and rack when in locked position in all three directions.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. Chassis and rack apparatus for use with electronic equipment, said apparatus comprising a cover panel, a chassis mounted on the inner side of the cover panel, a stationary rack having side walls and a front end opening adapted to receive and hold said chassis, a keeper pin mounted on the side walls of the rack, combined engaging and latching means mounted on the inner side of the cover panel for camming the cover panel into and out of flush position with the rack and for positively latching the cover panel in flush position with the rack, and handle means operatively connected to said combined engaging and latching means.

2. Chassis and rack apparatus for use with electronic equipment, said apparatus comprising a cover panel, a chassis mounted on the inner side of the cover panel, a stationary rack having side walls and a front end opening adapted to receive and hold said chassis, a keeper pin mounted on the side walls of the rack, a lever with one end pivotally mounted on said chassis, a double cam pivotally mounted on said chassis and adapted to engage said keeper pin to cam the cover panel into and out of flush position with the rack, means pivotally and slidably connecting said lever to said double cam, and handle means operatively connected to said lever for turning said lever about its pivot.

3. The chassis and rack apparatus defined in claim 2, wherein a spring is mounted on said chassis in contact with the movable end of said lever to maintain it in open or closed position.

4. The chassis and rack apparatus defined in claim 2, wherein said double cam includes a convex surface and a concave surface defining a curved cam slot.

References Cited in the file of this patent

UNITED STATES PATENTS

| | | |
|---|---|---|
| 1,729,864 | Brown | Oct. 1, 1929 |
| 2,510,807 | Fosberg | June 6, 1950 |
| 2,544,314 | Hebbel | Mar. 6, 1951 |
| 2,609,268 | Nye | Sept. 2, 1952 |
| 2,750,217 | Landholt | June 12, 1956 |
| 2,771,523 | Stoecklin | Nov. 20, 1956 |
| 2,788,253 | Gussack | Apr. 9, 1957 |
| 2,789,851 | Lickteig | Apr. 23, 1957 |